No. 780,701. PATENTED JAN. 24, 1905.
J. W. BIDDLE & F. B. KEISER.
OIL SEPARATOR.
APPLICATION FILED FEB. 15, 1904.
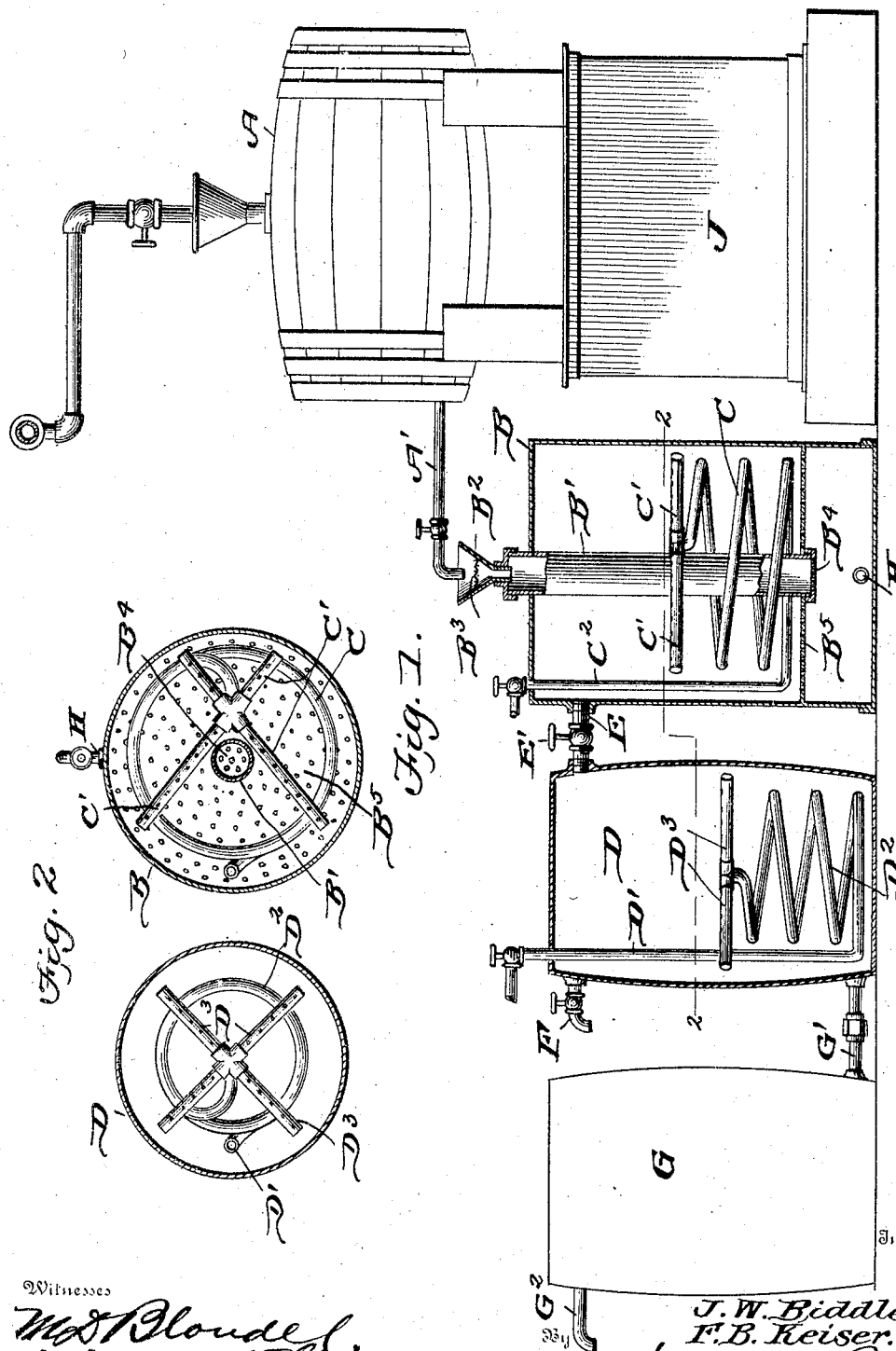
Witnesses
Inventors
J. W. Biddle.
F. B. Keiser.
Attorneys No. 780,701. Patented January 24, 1905.

UNITED STATES PATENT OFFICE.

JOSEPH W. BIDDLE AND FRANKLIN B. KEISER, OF THOMAS, ALABAMA.

OIL-SEPARATOR.

SPECIFICATION forming part of Letters Patent No. 780,701, dated January 24, 1905.

Application filed February 15, 1904. Serial No. 193,754.

*To all whom it may concern:*

Be it known that we, JOSEPH W. BIDDLE and FRANKLIN B. KEISER, citizens of the United States, residing at Thomas, in the county of Jefferson and the State of Alabama, have invented a new and useful Improvement in Oil-Separators, of which the following is a specification.

This invention relates to a device for separating refuse oil from the foreign matter with which it has become associated; and the object of the device is to purify refuse lubricating-oils, so that they may be suitable for reuse.

The invention consists of the novel features of construction and combination of parts hereinafter described, particularly pointed out in the claims, and shown in the accompanying drawings, in which—

Figure 1 is a view, partly in side elevation and partly in vertical section, of the complete device. Fig. 2 is a section on the line 2 2 of Fig. 1.

In the drawings, A represents a receiving-reservoir in which the refuse oil is collected and held until a sufficient amount or quantity has accumulated. The oil is then passed from the reservoir A through the discharge-pipe A' and discharged into the tank B through a pipe B', arranged vertically and centrally in the tank B. At its upper end the pipe B' carries a funnel $B^2$, having a strainer $B^3$ arranged therein, and at its lower end the pipe B' is closed by a perforated bottom piece $B^4$, which serves as an additional strainer. The lower end portion of the pipe B', carries a diaphragm $B^5$, suitably perforated and having a diameter equal to the interior diameter of the tank B. Immediately above the diaphragm $B^5$ and encircling the pipe B' is a coil of pipe C, having at its upper end a four-way coupling, from which extend horizontally the four pipes C', closed at their free ends and perforated along their upper sides. The opposite lower end of the coil is connected to a suitable steam-pipe $C^2$. Arranged adjacent the tank B is the cooling-tank D, having a water-pipe D' extending downwardly to a point adjacent the bottom of the tank and terminating in a vertically and centrally arranged coil $D^2$, also carrying at its upper end the radiating horizontal pipes $D^3$, perforated along their upper sides. The upper portions of the tanks B and C are connected by a pipe-section E, in which is arranged a suitable valve having the valve-handle E'. A faucet F is arranged adjacent the top of the tank D, through which the cleansed oil may be drawn.

Adjacent the tank D is arranged an equalizing-tank G, connected in its lower portion to the lower portion of the tank D by the pipe-section G', and it will be obvious that as the tank G discharges through the pipe $G^2$ adjacent its top the level of the water in the tank D will not be lowered, as would be the case were the water drawn directly from the lower portion of the tank D and permitted to escape without passing into the tank G.

Hot water and steam are discharged into the tank B and cold water into the tank D, and when steam is turned on and passes into the tank B through the perforations in the pipes C' the water in the said tank is brought to a boiling-point. Oil fed through the pipe B' is thinned by contact with the hot water, and the agitation of the boiling water will force the oil upward and separate it from all the heavy particles of foreign matter, which latter will sink to the bottom by reason of their weight and will be further impeded from following the oil by the diaphragm $B^5$ should the agitation of the water tend to throw them upward. The oil is drained from the top of the tank B through the pipe E and fed into the cooling-tank D, and the lighter particles of foreign matter which passed up through the diaphragm $B^5$ and accompanied the oil into the tank D are broken up in passing over the cooling-sprays from the pipes $D^2$ and are precipitated to the bottom of the tank D. A drain H is arranged in the side of the tank B by which the water therein and the sediment that may collect may be drawn off, and similar discharge-drains may be provided for the other tanks, if desired. After the oil has been drawn from the tank D it may be conveyed in any desired manner to a suitable receiving-receptacle. In practice we prefer to mount the reservoir A upon a tank or receptacle J, in which the purified oil may be contained, thus saving storage-space by utilizing the support for the tank A.

Having thus fully described our invention, what we claim as new, and desire to secure by Letters Patent, is—

1. In an oil-separator, a tank, a centrally-arranged pipe opening upwardly above the tank and terminating adjacent the bottom of the tank, a perforated diaphragm arranged on the lower end portion of the pipe and having a diameter equal to the inner diameter of the tank, a steam-coil arranged above the diaphragm and encircling the pipe, horizontally-arranged and perforated pipes carried by the upper end of the steam-coil, means for admitting refuse oil into the upper end of the centrally-arranged pipe, and means for drawing the oil from the upper portion of the tank.

2. A device of the kind described comprising a tank adapted to receive refuse oil, a steam-coil arranged in the said tank, a tank having a cold-water coil arranged vertically and centrally in its lower portion and adapted to spray water upwardly, a discharge-pipe leading from the upper portion of the tank first mentioned and discharging into the second-mentioned tank above the coil arranged therein, and an equalizing-tank arranged adjacent the second-mentioned tank and having communication at its lower end portion with the lower portion of the said second tank, as and for the purpose set forth.

3. A device of the kind described comprising a reservoir, a tank having a vertically-arranged pipe therein, the said pipe having a perforated bottom at its lower end and projecting at its upper end above the top of the tank, a funnel in the upper end of the said pipe, a strainer in the funnel, a valve-controlled discharge-pipe leading from the reservoir and adapted to discharge into the said funnel, a perforated diaphragm arranged horizontally in the tank substantially in the plane of the lower end of the vertical pipe, a steam-coil arranged above the diaphragm and encircling the said pipe, a four-way coupling carried by the upper end of the coil, horizontally-arranged pipes perforated along their upper sides carried by the coupling, said pipes being closed at their free ends, a cooling-tank, and means for discharging oil from the upper portion of the first-mentioned tank to the cooling-tank.

J. W. BIDDLE.
FRANKLIN B. KEISER.

Witnesses:
R. L. TILGHMAN,
W. D. SHUMATE.